June 19, 1934.   R. L. PENNEY   1,963,590
POWER TRANSMISSION
Filed June 3, 1933   3 Sheets-Sheet 1
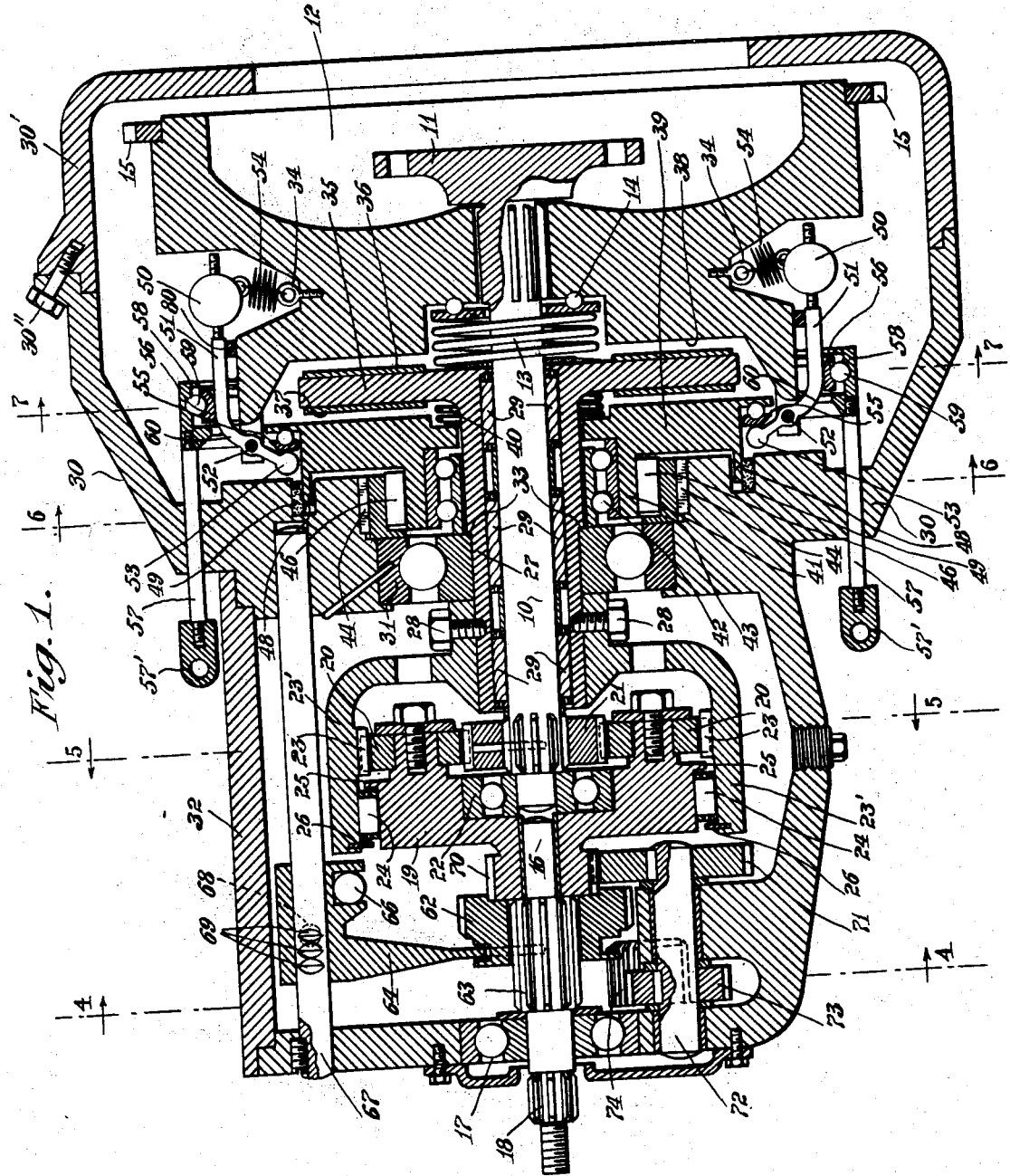
Fig. 1.
Robert L. Penney
INVENTOR
ATTORNEY

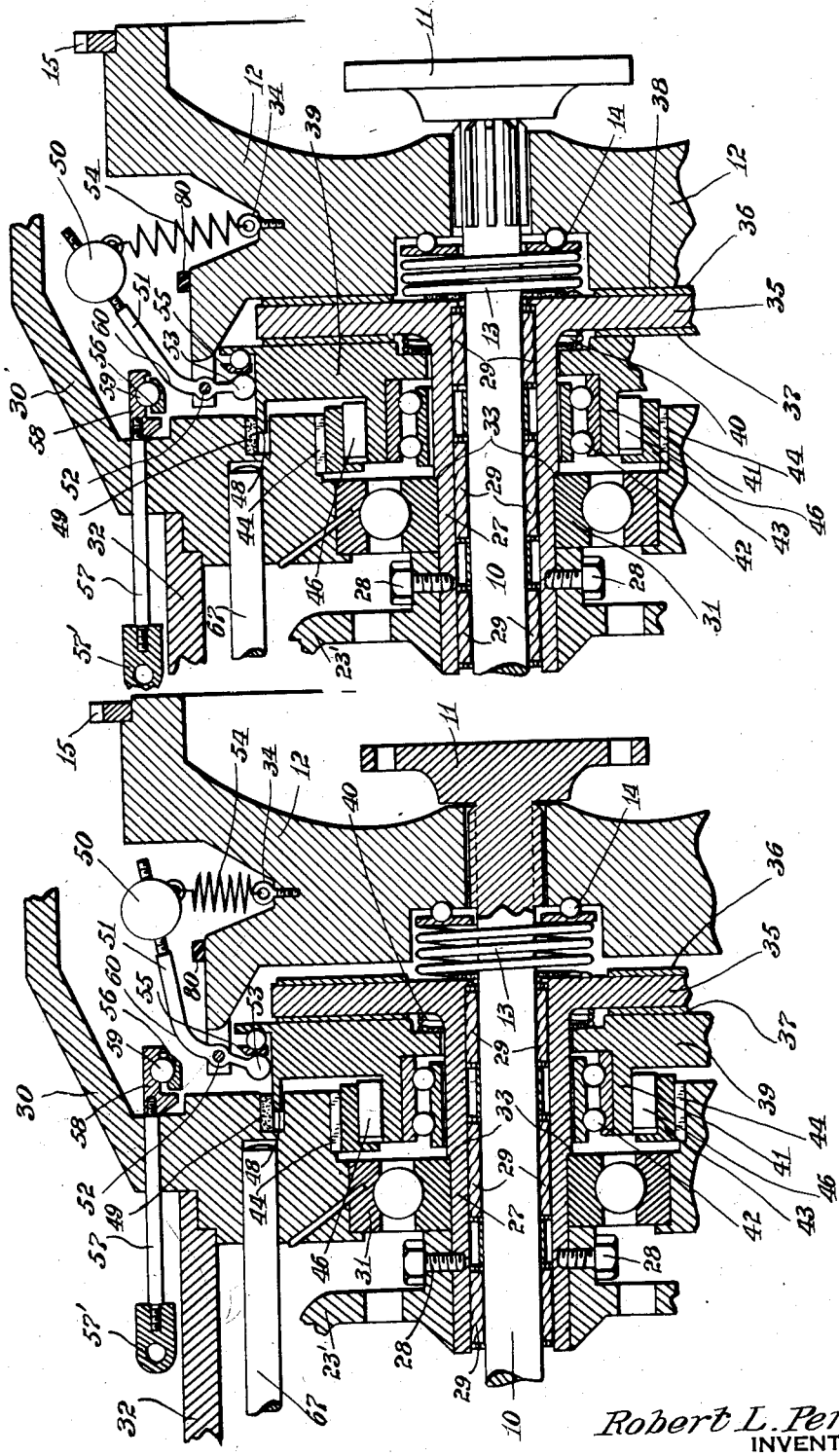

June 19, 1934. R. L. PENNEY 1,963,590
POWER TRANSMISSION
Filed June 3, 1933 3 Sheets-Sheet 3
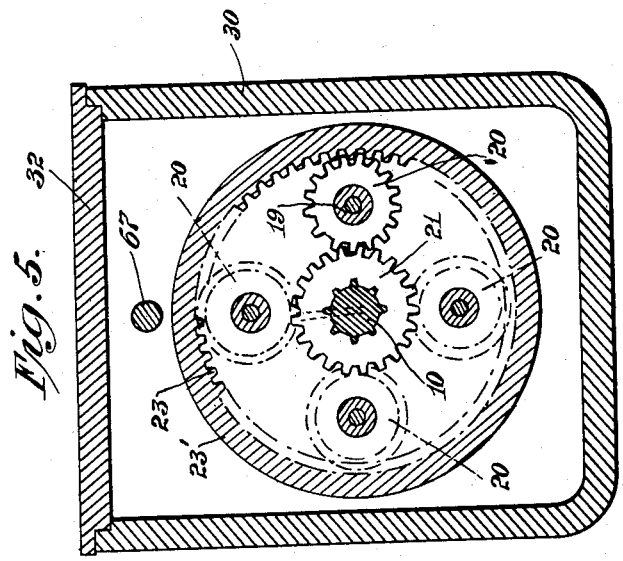
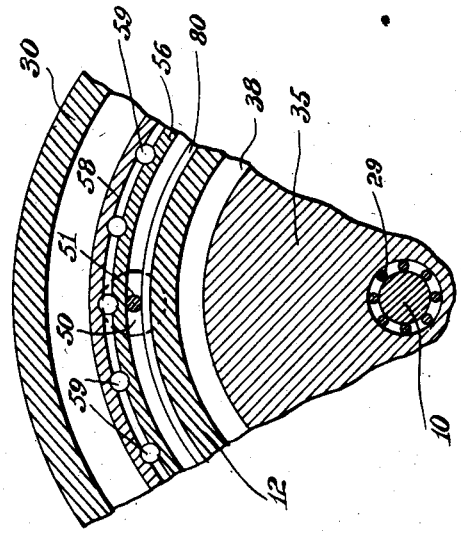
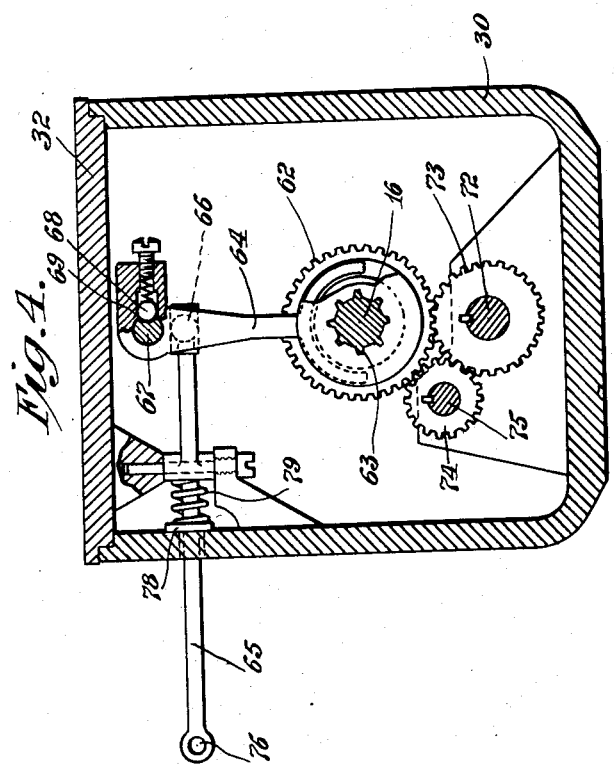
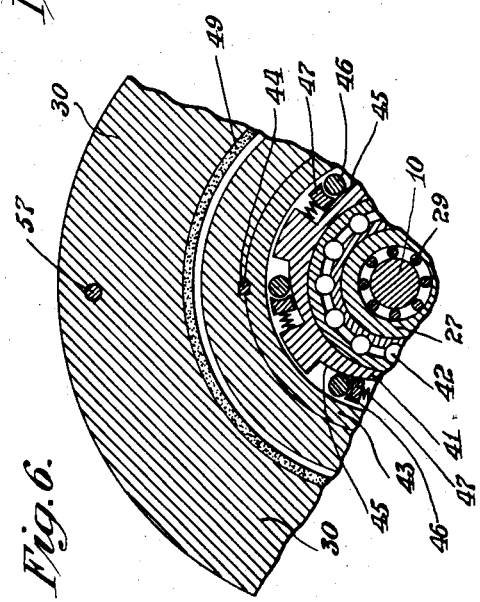
Robert L. Penney
INVENTOR
BY
ATTORNEY Patented June 19, 1934

1,963,590

UNITED STATES PATENT OFFICE 1,963,590

POWER TRANSMISSION

Robert L. Penney, New York, N. Y.

Application June 3, 1933, Serial No. 674,191

20 Claims. (Cl. 74—260)

This invention relates to transmission mechanism and particularly to the type thereof suitable for use with automobiles, the principal object being the provision of a device simple in construction, efficient in operation and economical to manufacture and maintain.

A further object of this invention is the provision of a completely automatic device for the transmission of power in an automobile.

Another object of this invention is the provision of a novel type of reflex clutch, used in conjunction with constant mesh gearing of the planetary type.

Another object is to provide a device which eliminates the manually operated change-gear train in an automobile.

Another object is to provide a device which eliminates the pedal-operated clutch used on all present-day automobiles.

Another object is the provision of a transmission mechanism automatically controlled by the movement of the accelerator pedal and by the speed of the car.

In the accompanying drawings I have illustrated details of one form of the invention embodying a planetary gear connection between the driving and driven shafts, together with a one-way wedging clutch and friction clutch members which are brought into action successively through and controlled by the speed of the motor and the speed and load of the car.

One of the friction clutch members rotates with the driving shaft, a second friction clutch member rotates with the annulus gear of the planetary system, and a third member can rotate in one direction only with the second clutch member and the connected annulus. Two of these three members are arranged to slide with respect to the remaining member. In the form shown the first and third members are slidable in the housing and the second member rotates but does not slide.

Fig. 1 is a longitudinal sectional view showing the parts in what may be termed the normal or unoperated position.

Fig. 2 is a fragmentary section showing certain parts in the position which they occupy when the emergency brake is released and the car is moving at a speed which would correspond ordinarily with the second-speed gear with a common three-speed automobile transmission.

Fig. 3 is a similar view showing the position of the parts with the car moving in high-speed gear or direct drive.

Fig. 4 is a transverse sectional view on the plane of the line 4—4 of Fig. 1 showing parts of the reverse mechanism.

Fig. 5 is a transverse sectional view on the plane of the line 5—5 of Fig. 1 showing parts of the planetary gear construction.

Fig. 6 is a fragmentary section on the plane of the line 6—6 of Fig. 1 showing the automatic one-way wedging clutch.

Fig. 7 is a fragmentary sectional view on the plane of the line 7—7 of Fig. 1 showing the means for controlling the centrifugal governor-weights.

The driving shaft 10 has a flange 11 to which the crank shaft of the motor (not shown) is connected in the usual manner. The fly wheel 12 is splined on the driving shaft and adapted to slide toward the left, as viewed in Fig. 1, being held in the position shown by means of a spring 13 and a thrust bearing 14. It will be understood that the fly wheel may be provided with a ring gear 15 for application of an automatic starter pinion in the usual manner.

The driven shaft 16 is supported on one end in a suitable bearing 17 and provided with a connection 18 to the usual universal joint or other connection to the propeller shaft and road wheels (not shown). The other end is coaxially journaled in a bearing in the gear 70 and the spider 19.

A planetary gear spider 19 is mounted on the driven shaft and supports a series of pinions 20 in the usual manner, which mesh with the sun gear 21 on the driving shaft 10. The end of the shaft 10 is also supported in a pilot bearing 22 contained in the spider so as to hold the parts in proper alignment. The outer member of the planetary train consists of an annular gear 23 supported in a housing or carrier 23'. This gear 23 is in constant mesh with the planet pinions 20. Roller bearings 24 may also be provided between the spider 19 and the carrier 23'. These bearings 24 are laterally positioned by flanges 25 on the spider 19 and by a split force ring 26 in the carrier 23'. The carrier 23' is mounted upon a sleeve 27 to which it is secured by one or more cap screws 28. This sleeve 27 is supported upon the driving shaft 10 with the interposed roller bearings 29, 29, 29.

The main housing 30 supports the ball bearing 17 for the driven shaft and the ball bearing 31 for the sleeve 27 and the driving shaft 10. A removable cover 32 provides access to the interior of the housing. The end plate 30' may be secured to the body of the housing by cap screws 30" and may be secured to the motor block (not shown) in any suitable manner.

The sleeve 27 is provided with a shoulder 33 which abuts against the inner race of the bearing 31 to take up thrust of the sleeve in one direction while the carrier 23' bears against the opposite side of the inner race of the bearing 31 to take up thrust in the other direction. The spring 13, previously mentioned, presses against the thrust bearing 14 in one direction and against the sleeve 27 in the opposite direction.

The sleeve 27 carries a clutch member 35 which may be in the form of a disc or flange and provided with suitable facings 36 and 37. The face 36 is adapted at the proper time to coact with the bearing face 38 on the fly wheel, and the face 37 is adapted to coact with a disc 39 which is normally held pressed away from the clutch member 35 by a spring 40. This disc 39 has a flange or hub 41 supported on a bearing 42, which bearing is mounted to slide on the sleeve 27 from the position shown in Fig. 1 to the position shown in Figs. 2 and 3, the inner race of the bearing being free of the sleeve 27.

The disc 39 also carries, on its outer periphery, the ring thrust bearing 55 and a circular oil lip 48 which runs in a ring pocket opening in the housing 30 and which bears against the felt oil-retaining ring 49.

Outside of the hub 41 is a ring 43 which is mounted to slide longitudinally on splines or keys 44 in the main stationary housing 30.

The hub 41 is provided with a series of inclined or cam surfaces 45, as can most clearly be seen in Fig. 6. Clutch rollers 46 with spring-pressed shoes 47 are mounted between the hub 41 and the ring 43 in a well-known manner so that the members 41 and 43 with the interposed spring-pressed rollers 46 constitute an automatic one-way overrunning clutch of the wedging type.

The automatic governing mechanism includes a number of weights 50, each of which is adjustable on the threaded end of lever 51 which is hinged at 52 to the fly wheel 12 and provided with a ball-end extension 53. The weighted end of the governor member 51 is held inwardly by a spring 54 and rests on a soft rubber ring 80 around the fly wheel 12. The other end 53 is adapted to press against the disc 39, preferably through the medium of a thrust ball-bearing ring 55 mounted around the periphery of the disc 39.

Normally the centrifugal governor-weights are held inwardly by a ball-bearing locking ring composed of inner ring 56, outer ring 58 and balls 59. This ring is connected to the emergency brake lever (not shown) by a number of rods 57 and provided with connections 57' so that when the emergency brake is "on" the governor members are locked. When the emergency brake lever is released the locking ring is immediately retracted even before the brake itself is free. The levers 51 are preferably provided with inclined or rounded cam-like surfaces 60 to coact with a corresponding bevelled face on the ring 56 so as to facilitate the movement of this locking ring from left to right, as viewed in Fig. 3.

The driving connection between the spider 19 and the driven shaft 16 is effected through gearing which is constructed and arranged to permit reversal of the direction of application of power. The gear member 62 is mounted to slide on the splined part 63 of the driven shaft 16 and may be moved back and forth by a shifting fork 64 through the medium of a reversing lever 65 and universal connection 66. The fork 64 is mounted to slide on the shaft 67 and may be held yieldingly in its forward, neutral, and reverse positions by a spring-pressed ball 68, engaging detents 69 in the shaft 67. The spider 19 is provided with a toothed portion 70 which normally interlocks with the sliding gear 62 for driving in a forward direction. The gear teeth 70 also mesh with a gear 71, which is keyed on the shaft 72. The shaft 72 is journaled in the housing 30 and carries a pinion 73 which meshes with an idler gear 74 which runs on a layshaft 75 supported by the housing 30. In Fig. 1, for the sake of clarity, the reverse shaft 75 has been omitted but it can be clearly seen in Fig. 4. When driving in a forward direction the gear 70 drives gear 71 and its shaft 72 and pinion 73 and the reverse gear 74 idly.

Reverse direction of drive is effected by shifting the gear 62 out of engagement with the gear 70 and into mesh with the reverse gear 74.

Referring to Fig. 4, the lever 65 is pivoted on a pin which is supported by a downward extension of the cover 32 and by an inner projection of the main housing 30. The lever 65 continues past the pivoting pin 77 and extends through an opening in the housing 30, ending in an eye 76 outside the housing 30.

This eye 76 is connected in any suitable manner to an actuator (not shown) at the instrument panel or on the steering column of the car, to be manually operated by the driver only when he wishes to reverse the car. The portion of the lever 65, between the pivot pin 77 and the housing 30, has around it a spring-pressed oil-retaining washer 78 to prevent leakage of oil to the outside of the housing 30.

The springs 40 and 13 are compression springs of relative bias values of about 1:3 so that, if the spring 40 has a value of 30 pounds when compressed ¼ inch, the spring 13 will have a value of at least 90 pounds when compressed the same distance. These two springs 40 and 13 should also be of such lengths that normally, in the unoperated position as shown in Fig. 1, they will position the disc 39 and the fly wheel 12 equidistant from the clutch member 35. Assuming these equal distances to be ¼ inch and with the arbitrary arrangement of proportionate tensions as mentioned above, it will be seen that the governor levers 53 will be able to move the locking disc 39 into contact with the lining 37 of the clutch member 35 at a pressure of at least 90 pounds before the fly wheel friction face 38 makes initial contact with the lining 36 of the opposite side of the clutch member 35.

The locking disc 39 with its hub 41 can rotate clockwise only as viewed in Fig. 6 and from the right in Fig. 1, and is locked against counter-clockwise rotation by the rollers 46.

It will be noticed that the governor-weights 50 are adjustable as regards the fulcrums of the levers 51. This adjustment is accomplished by unhooking the springs 54 from the screw eyes 34 and threading the weights 50 right or left along the screw portion of the levers 51.

As previously mentioned, all parts of Fig. 1 are shown in their normal or unoperated positions, that is, the positions which they occupy when the emergency brake is fully applied and when the engine and the car are stationary. If this transmission were installed in an automobile, the clutch housing end plate 30' would be attached to the engine block, the flange 11 would be bolted to the crank shaft of the engine and the splined section 18 of the driven shaft 16 would be secured to the universal joint and propeller shaft of the car. Also the eyes 57' and 76 would be connected as described heretofore.

The operation of my improved transmission will now be described. Assuming that the car is stationary and that the emergency brake is applied, the operator can start the engine and warm it up so that it runs smoothly, the engine being automatically held disconnected from the car because the emergency brake is on, when the parts will be as shown in Fig. 1 and the clutch is held open. As soon as the engine starts, and assuming that it turns in a clockwise direction, as viewed from the right in Fig. 1, it will, in turn, rotate the flange 11, the fly wheel 12, and the driving shaft 10.

The driven or load shaft 16 is, of course, assumed to be stationary when the car is stationary and the gear 62 is in mesh with the gear 70 which holds the spider 19 stationary. Rotation of the driving shaft 10, therefore, rotates the sun gear 21 clockwise, which rotates the planet gears 20 counterclockwise and the annular gear 23 and carrier 23' counterclockwise. This carries with it the sleeve 27 and the clutch member 35, all rotating in a counterclockwise direction when the engine is turning and the car is stationary. But, although these parts of the transmission are rotating, no power is transmitted to the car as the power flow comes to an open point in the power path at the clutch member 35 and is here freely dissipated into the air. No power is therefore transmitted to the driven shaft until the emergency brake lever is operated sufficiently to retract the holding ring 56 from the governor levers 51, as shown in Fig. 2. When the engine is warm enough, the operator first retards the hand throttle or lets up the accelerator pedal, thereby allowing the engine to idle. Then he releases the emergency brake lever. The car is now in condition to be moved forward as the rods 57 and their associated parts have been moved to the left or rearward to the position shown in Fig. 2 and the centrifugal weights 50 and levers 51 may now operate. But as these parts 50 and 51 are so adjusted that they do not begin to operate until the engine has attained a certain predetermined speed much above idling speed, they will stay in the normal positions shown in Fig. 1 until that certain speed is attained.

The operator, when he wishes to move the car forward, now depresses the accelerator pedal and speeds up the engine, when the weights 50 will start to move centrifugally. At some predetermined speed, these weights 50 will have accumulated enough force to overcome the tension of the springs 54 and, by rocking the levers 51, will move the thrust bearing 55 and the locking disc 39 into contact with the linings 37 of the clutch member 35, thereby compressing the spring 40. The counterclockwise rotation of the clutch member 35 thus transmits power to the disc 39 in a counterclockwise direction so that the clutch rollers 46 are locked against the ring 43, which is stationary as regards rotation but which can move longitudinally on the splines 44. This tends to decelerate the rotation of the clutch member 35, the connected carrier 23', and the annular gear 23. As the clutch member 35 is decelerated, there will be a speed difference between this clutch member 35 and the driving shaft 10 other than the normal speed difference and this speed difference will be transmitted to the road wheels of the car because the planetary gears 20 are then compelled to run around the inside of the annular gear 23 so that power is applied to the spider 19 and through the gear 70 and gear 62 to the driven shaft 16, thus starting the car in low speed and in a very high gear ratio.

As the engine and car accelerate in this very low gear, the governor-weights 50 are gradually and continuously moving outward from the position shown in Fig. 1 to that shown in Fig. 2, bringing the disc 39 into increasingly harder contact with the clutch member 35, thus increasingly decelerating this clutch member 35 from its counterclockwise rotation.

During this time, the gear ratio is constantly decreasing in direct proportion to the amount of deceleration of the clutch member 35 and the connected carrier 23' and annular gear 23 and the ground speed of the car will be constantly increasing. Thus we approach the ideal condition of a constantly increasing vehicle speed coupled with a constantly decreasing gear ratio. When finally the weights 50 have moved the disc 39 into the position shown in Fig. 2, the disc 39 will be in such hard frictional contact with the clutch member 35 as to render this clutch member 35 rotationally motionless. At this time, the car will be moving forward in a fixed gear corresponding to the second gear of a normal automobile or a gear of about 2:1 ratio. It will be apparent that the full torque of the engine can now be applied to the car in a low gear if necessary, as for ascending a steep hill. The car will now be moving at a speed of between 10 and 15 miles per hour. When it attains a speed slightly over 15 miles per hour, the governor-weights 50 will have accumulated enough additional centrifugal force to start contacting the face 38 of the fly wheel 12 against the face 36 of the clutch member 35 and the various parts will begin to take the positions shown in Fig. 3. It will be noticed that, since the clutch member 35 cannot move longitudinally in either direction, the fly wheel 12 is compelled to move toward the left against the pressure of the spring 13. At this point the disc 39 and the clutch member 35 are motionless while the fly wheel 12 is rotating clockwise.

As the face 38 contacts the face 36, the fly wheel 12 will gradually pick up the clutch member 35, together with the disc 39, and rotate both these parts in a clockwise direction, the rollers 46 of the one-way clutch now automatically unlocking. As the clutch member 35 and its connected sleeve 27, carrier 23' and annular gear 23 begin to turn clockwise, the ratio of the sun gear 21 to the planet gears 20 and the spider 19 will tend to decrease in direct proportion to the acceleration of the clutch member 35 and annular gear 23. In other words, this clockwise acceleration of the clutch member 35 and its associated parts now tends to decrease the ratio between the driving shaft 10 and the driven shaft 16 by tending to lock the planet pinions 20 from rotation on their shafts by gradually bringing the annular gear 23 to synchronous speed with the sun gear 21. During this clockwise acceleration of the clutch member 35 and the annular gear 23, the car will continue to move forwardly but at an increasingly higher ground speed and at a decreasingly lower gear ratio, when we have the same ideal condition as heretofore noted.

During this transition from a fixed low gear to direct drive, as above described, we have what constitutes a Y drive, that is, there are two paths for the conduction of torque between the driving and the driven shafts, these two paths centering at the planet pinions 20. One path is—driving shaft 10, sun gear 21, planet pinions 20, spider 19, etc.; and the other path is—driving shaft 10, fly wheel 12, clutch member 35, sleeve 27, carrier 23', annular gear 23, planet pinions 20, spider 19, etc.

When finally the clutch member 35 is frictionally locked to the fly wheel 12 and when both these parts are rotating in the same direction and at the same speed, the gear ratio between the driving shaft 10 and the driven shaft 16 will be 1 : 1 and the engine will be seen to be connected in direct drive through to the driven shaft 16 since the shaft 10, fly wheel 12, clutch member 35, sleeve 27, carrier 23', annulus 23, and sun gear 21 are all rotating in a clockwise direction and at the same speed. At this point, the various parts will be in the positions shown in Fig. 3 and the transmission will revolve as a single unit in the two main bearings 17 and 31 in the housing 30, with none of the constituent parts independently rotating. Once coupled in direct drive, as above described, the car can be driven under control of the accelerator at various speeds. There are thus four successive conditions in the forward acceleration period:

1. As the locking disc 39 starts to decelerate the clutch member 35 from counterclockwise rotation, the car will start to move forward in a very low gear and in a very high gear ratio.

2. As the locking disc 39 locks the clutch member 35 from counterclockwise rotation, or in other words, as the locking disc 39 brings the clutch member 35 to a rest, the car will move forward in a medium gear ratio, corresponding to second gear in an ordinary car.

3. As the fly wheel 12 starts to rotate the clutch member 35 in a clockwise direction, the car will start to move forward in a still higher gear and at a still lower gear ratio.

4. When finally the clutch member 35 is rotated in the same direction and the same speed as the fly wheel 12, the car will move forward in its lowest gear ratio, that is, 1:1 or direct drive.

Of the four conditions stated immediately above, it will be noted that, aside from the direct drive position, there is only one time that the car is in a fixed gear ratio. This is when, as in paragraph #2 above, the clutch member 35 and therefore the annulus 23, is motionless. It will further be noted that the car goes into and comes out of this fixed gear ratio in a gradual and constant progression, so that, under certain conditions, this fixed gear step might act as merely one of the infinite number of steps from neutral to direct drive. That is, when the clutch weights 50 and springs 54 are of the correct values and properly adjusted, taking into consideration the power and speed of the motor, the load and speed of the car, the amount of surface on the clutch facings 36 and 37, etc. and when the car is on fairly level ground, the car will start to move forward with the transmission in a constantly and gradually decreasing but low gear until the clutch member 35 becomes motionless when the car will continue to move forwardly with the transmission in a steady or fixed gear of about 2:1 ratio until a speed of about 15 miles per hour is reached.

At this time, the governor weights 50 will have accumulated enough additional centrifugal force to move the levers 51 still further and so move the fly wheel 12 into contact with the clutch member 35, thereby compressing the spring 13. As the fly wheel 12 starts to turn the clutch member 35, the car will continue forward with the transmission in a constantly decreasing gear ratio until, when finally the clutch member 35 is rotating in the same direction and at the same speed as the fly wheel 12, the car will be moved forward in its highest gear or direct drive. But assuming that the car is on level ground and considering that the ratio of the fixed gear condition is 2:1, it will be seen that it is entirely conceivable that the car might have attained a speed of 14 miles per hour before the clutch member 35 became entirely motionless. And since at 15 miles per hour the clutch member 35 will begin to turn clockwise, then it will be understood that the clutch member 35 was motionless only momentarily and that, therefore, the car was in the fixed gear condition only momentarily. In other words, the car will remain in the fixed gear for an appreciable period only at specific necessary times, as when starting on a steep hill or when the car is heavily burdened.

When the car is moving in direct drive at high speed and when the car speed is decreased sufficiently to allow the weights 50 to restore to the positions shown in Fig. 2, the transmission will automatically assume its second gear condition, but will not actually be in this second gear unless and until the engine is re-accelerated while the car is in this condition.

This transition from direct drive to a reduced drive condition normally will take place at a considerably lower vehicle speed than when the transmission is put from the reduced drive to the direct drive during the acceleration period. In other words, this change to the reduced drive while decelerating will take place at about 9 to 11 miles per hour with this construction. This is due to the fact that a relatively small amount of torque is transmitted from the engine to the road wheels of the car during the period when the speed of the car is being decreased as compared to the relatively great force which must be exerted to accelerate the load of the car from a stationary position. Thus it will be seen that the torque transmitted, as well as the speed, is an active factor in controlling the operation of this transmission.

If the operator now allows the car to decelerate sufficiently to bring the transmission into the reduced gear condition as shown in Fig. 2 and if the car is re-accelerated while in this condition it will automatically be put again into a low gear and, as described above, from there may go again into direct drive when sufficient speed has been attained.

When the operator allows the engine and car to decelerate sufficiently to bring the governor-weights 50 back to the normal or unoperated position shown in Fig. 1, the transmission will then be in neutral and the road wheels entirely disengaged from the engine. In this construction, this transition to neutral would take place at a very low vehicle speed, or at less than 5 miles per hour.

When the operator re-accelerates from this neutral condition, regardless of the speed of the car, the transmission will again go through the regular forward sequence of action, into the decreasing low gear, to the fixed second gear, into the decreasing high gear, to direct drive as heretofore described. Thus it will be seen that, regardless of the operator's actions, this transmission will always automatically be in the best gear ratio to most efficiently move the car.

If, after the car has been brought to rest and the parts have taken their neutral positions as shown in Fig. 1 and the operator applies the emergency brake, the locking ring 56 will be moved from the position shown in Fig. 2 to the position shown in Fig. 1, thus holding the levers 51 and their weights 50 in the inactive or unoperated position. Acceleration of the engine at this time would have no effect on the movement of the car.

Reverse drive of the car is effected by merely shifting the gear 62 by means of the fork 64 and the lever 65 in the usual manner. The car is thus provided with an automatic gear shifting mechanism effective in a reverse direction, the same as the automatic shift is effected in the forward direction, but at whatever reduced rate may be provided by the ratio of the reverse gears.

It will be noted that there is no break or disconnection in the flow of power from the engine to the road wheels of the car at any time during the acceleration period and that, in the transition from the fixed gear ratio to direct drive, regardless of how the clutch is applied or how much it slips, the car is never out of gear nor disconnected from the engine. In other words, it is impossible to put the car into neutral gear from any high gear, without first going into second gear because, in this construction, there is only one neutral position when the engine is disconnected from the car, and that is before the lowest gear. There are no neutral positions at, or between, any gear ratios or steps.

It will further be noted that there is a constant and gradual decrease in the gear ratio, from theoretical infinity to zero, or from an arbitrary ratio of 10:1 to a positive ratio of 1:1 and that since there are no steps in the gear ratio sequence, there are consequently, no jerks or strains on the transmission, engine or car.

By a slight variation in the construction shown, this transmission could be made additionally powerful and more useful. This could be attained in a manner commonly employed in gear shafts by simply adding another gear to the countershaft 72 between the gears 71 and 73, which additional gear would be of such size and so placed as to coact with the change-gear 62 in a well-known manner.

If then, the shaft 67 were provided with another indent similar to and cojoining the indents 69 it would be seen that the fork 64 and the gear 62 would now have four longitudinal positions, namely,—direct drive, neutral, low gear, and reverse drive. The automatic transmission would then be seen to have two ranges which the inventor prefers to refer to as the speed range and the power range. The speed range would be in operation when the gear 62 is connected to the gear 70, as shown in Fig. 1. The power range would be in operation when the gear 62 was moved out of connection with the gear 70, past the neutral position, and into mesh with the teeth of the additional countershaft gear. When the transmission is in this power range it will be seen that the successive ratios of the planetary gearing will now be passed through this countershaft gearing so as to further reduce the overall ratio. This power range would be useful when ascending or descending an especially steep hill, when towing another vehicle, etc.

It will be seen that, in this construction, no outside agency or force is required for the control or operation of the transmission with the necessary exception of the operation of the accelerator pedal.

Although a specific embodiment of the invention has been illustrated and described here, it will be understood that various alterations in the details of construction or in the method of control may be made without departing from the scope of this invention as indicated by the appended claims.

I claim:

1. Power transmission mechanism comprising a housing, a driving shaft extending therein and having a fly wheel splined to rotate with the shaft and slidable thereon, a driven shaft extending into the housing, a sun gear on the driving shaft, a spider on the driven shaft carrying planet gears meshing with the sun gear, a carrier rotatable about the driving shaft and having an annular gear meshing with the planet gears, a friction clutch member carried by the carrier, a friction disc mounted to rotate in one direction about the driving shaft and slidable toward and from the friction clutch member, a one-way wedging clutch between said friction disc and said housing, and centrifugally operable means for sequentially shifting the friction disc toward and from the friction clutch member and shifting the fly wheel toward and from the friction clutch member.

2. Power transmission mechanism comprising a driving shaft having a fly wheel splined to rotate with the shaft and slidable thereon, a driven shaft, a sun gear on the driving shaft, a spider on the driven shaft carrying planet gears meshing with the sun gear, a carrier and sleeve rotatable on the driving shaft and having an annular gear on one end meshing with the planet gear and a friction clutch member on the other end, a friction disc mounted to rotate in one direction about the driving shaft and slidable toward and from the friction clutch member, a one-way wedging clutch for said friction disc, and means for shifting the friction disc toward and from the friction clutch member and shifting the fly wheel toward and from the friction clutch member.

3. Power transmission mechanism comprising a driving shaft having a fly wheel splined to rotate with the shaft, a driven shaft, a sun gear on the driving shaft, a spider on the driven shaft carrying planet gears meshing with the sun gear, a carrier and sleeve rotatable on the driving shaft and having an annular gear meshing with the planet gears, a friction clutch member carried by the carrier, a friction disc mounted to rotate in one direction about the driving shaft, a stationary abutment, a one-way wedging clutch between said friction disc and said abutment, and centrifugally operable means for sequentially effecting contact between the friction disc and the friction clutch member and between the fly wheel and the friction clutch member.

4. Power transmission mechanism comprising a driving shaft having a fly wheel splined to rotate with the shaft, a driven shaft, a sun gear on the driving shaft, a spider on the driven shaft carrying planet gears meshing with the sun gear, a carrier rotatable about the driving shaft and having an annular gear meshing with the planet gears and a friction clutch member, a friction disc mounted to rotate in one direction about the driving shaft and adapted to coact with the friction clutch member, means for sequentially effecting engagement between the friction disc and the friction clutch member and between the fly wheel and the friction clutch member and means actuated by the emergency brake lever for preventing such sequential operation.

5. Power transmission mechanism comprising a driving shaft having a first friction clutch member splined to rotate with the shaft and slidable thereon, a driven shaft, a sun gear on the driving shaft, a spider on the driven shaft carrying planet gears meshing with the sun gear, a carrier and sleeve rotatable on the driving shaft and having an annular gear on one end meshing with the planet gears and a second friction clutch member on the other end, a friction disc mounted to rotate in one direction about the driving shaft and slidable toward and from the friction clutch members, a one-way wedging clutch for said friction disc, and means for shifting the friction disc toward and from the friction clutch members.

6. Power transmission mechanism comprising a housing, a driving shaft extending therein and having a fly wheel splined to rotate with the shaft, a driven shaft extending into the housing, a sun gear on the driving shaft, a spider connected with the driven shaft and carrying planet gears meshing with the sun gear, a carrier rotatable about the driving shaft and having an annular gear meshing with the planet gears, a friction clutch member carried by the carrier, a friction disc mounted to rotate in one direction about the driving shaft and slidable toward and from the friction clutch member, a one-way wedging clutch between said friction disc and said housing, and centrifugally operable means for shifting the friction disc toward and from the friction clutch member.

7. Power transmission mechanism comprising a driving shaft having a friction member splined to rotate with the shaft and slidable thereon, a driven shaft, a sun gear connected to the driving shaft, a spider connected with the driven shaft and carrying planet gears meshing with the sun gear, a carrier rotatable about the driving shaft and having an annular gear meshing with the planet gears and a friction clutch member, a friction disc having a one-way clutch connection with the driving shaft and adapted to coact with the friction clutch member, means for effecting engagement between the friction disc and the friction clutch member and between the friction member and the friction clutch member, and means for preventing such engagement.

8. Power transmission mechanism comprising a driving shaft having a friction member splined to rotate with the shaft, a driven shaft, a sun gear on the driving shaft, a spider on the driven shaft carrying planet gears meshing with the sun gear, a carrier and sleeve rotatable on the driving shaft and having an annular gear at one end of the sleeve meshing with the planet gears and a friction clutch member at the other end, a friction disc mounted to rotate in one direction only about the driving shaft, means for sequentially effecting contact between the friction disc and the friction clutch member and between the friction member and the friction clutch member.

9. Power transmission mechanism comprising a driving shaft, a driven shaft, a planetary gear train for connecting said shafts including a sleeve rotatable on one shaft and connected to another part of the planetary gear train and rotatable when free in a direction opposite to the direction of the driving shaft, a centrifugal governor, means actuated by the acceleration of said governor for first automatically decelerating the reverse rotation of the sleeve and causing rotation of the driven shaft, means for then automatically holding said sleeve rotationally motionless for an indefinite period of time and thereby maintaining the transmission in a fixed reduced gear condition, and additional means for then automatically unlocking the sleeve from its motionless condition and driving said sleeve in the same direction of rotation as the driving shaft thereby accelerating the rotation of the driven shaft until said driven shaft is brought to synchronous rotation with the driving shaft.

10. Power transmission mechanism comprising a driving shaft and fly wheel, a driven shaft, a spider connected to the driven shaft and rotatable therewith, a sun gear on the driving shaft, a series of planet gears carried on the spider and meshing with the sun gear, an annular gear meshing with the planet gears, a rotatable carrier for the annular gear and means controlled by the speed of the driving shaft for stopping the rotation of the carrier and annular gear and then rotating the carrier and annular gear in the same direction as the driving shaft.

11. Power transmission mechanism including a driving shaft, a fly wheel carried thereby, a series of weighted levers carried by the fly wheel and a one-way wedging clutch acted upon by said levers and adapted to rotate with the driving shaft, and a clutch member between the wedging clutch and the fly wheel and adapted to transmit power from the driving shaft to a driven shaft.

12. Power transmission mechanism including a driving shaft, a centrifugal governor carried thereby, a wedging clutch rotatable in one direction with the shaft and a clutch member rotatable in either direction with respect to the shaft, said governor acting upon said clutch member to force it into engagement with said wedging clutch.

13. Power transmission mechanism including speed change gearing having a driving shaft and a driven shaft and means for gradually changing the speed ratio between the driving shaft and the driven shaft including clutch mechanism and a centrifugal governor controlling the change of speed ratio, and a ring slidably engaging portions of the governor to limit the action thereof and disconnect the driving shaft from the driven shaft.

14. Power transmission comprising a driving shaft, a driven shaft, a reduction gear train connecting said shafts including a gear member adapted to rotate with the driving shaft or in an opposite direction, automatic means for transmitting power from the driving shaft to the driven shaft through the gear train by a gradually decreasing speed ratio until the said gear member is stationary, means for holding said gear member stationary and said gear train in a fixed reduced ratio, and means for then gradually bringing the gear member to the speed of the driving shaft.

15. Power transmission apparatus comprising a driving shaft, a driven shaft, a variable speed gear train connecting said shafts including a gear member adapted to rotate in the same direction as the driving shaft and also adapted to rotate in the opposite direction, means governed by the speed of the driving shaft and frictionally retarded for controlling the rotation of said gear member and adapted to prevent the rotation of said gear member for an indefinite period of time, and additional means for locking said gear member to said driving shaft.

16. Power transmission mechanism comprising a driving shaft and a driven shaft in alinement therewith, a carrier mounted on the adjacent ends of the two shafts and having a reversing gear connection with the driven shaft and also carrying a number of planet gears, a sun gear carried by the driving shaft and meshing inside the planet gears, a sleeve rotatable on the driving shaft and provided with a bearing for the carrier and also having an annular gear surrounding the planet gears, said sleeve and annular gear being free to rotate when the driving shaft starts to rotate, means for automatically stopping the rotation of said sleeve as the driving shaft accelerates to a predetermined speed and means for subsequently coupling the driving shaft direct to the sleeve when the driving shaft reaches a predetermined greater speed.

17. Power transmission mechanism including a driving shaft, a driven shaft, a planetary gear train connecting the shafts and including a sleeve member adapted to rotate freely in a direction opposite to the direction of rotation of the driving shaft when the driving shaft is started, means for automatically and gradually stopping the rotation of the sleeve member when the driving member reaches a predetermined speed and holding the sleeve stationary while power is transmitted, and additional means for automatically starting the rotation of the sleeve member and bringing it gradually to rotate with the driving shaft when the driving shaft reaches a predetermined greater speed.

18. Power transmission mechanism including a driving shaft, a driven shaft, a planetary gear train connecting the shafts and including a sleeve member adapted to rotate freely in a direction opposite to the direction of rotation of the driving shaft when the driving shaft is started, a centrifugal governor and a one-way friction clutch member for automatically and gradually stopping the rotation of the sleeve member when the driving member reaches a predetermined speed, an additional friction clutch member for automatically starting the rotation of the sleeve member and bringing it gradually to rotate with the driving shaft when the driving shaft reaches a predetermined greater speed, said sleeve having separate friction surfaces for coacting respectively with the two clutch members and discrete spring members for moving the two clutch members away from the coacting friction surfaces of the sleeve.

19. Power transmission mechanism comprising a driving shaft, a driven shaft, planetary gear mechanism for connecting said shafts and including a rotor mounted on a part of said planetary gear mechanism and constituting one member of clutch mechanism, a clutch member rotatable with the driving shaft, a spring normally pressing said clutch member away from the rotor, a one-way clutch member adapted to coact with the rotor and a spring interposed between the rotor and the one-way clutch member for biasing the one-way clutch member away from the rotor and means for automatically controlling the movement of the one-way clutch member and the other clutch member.

20. Power transmission comprising a driving shaft, a driven shaft, a reduction gear train connecting said shafts, automatic means for transmitting power from the driving shaft to the driven shaft through said gear train by a gradually decreasing and stepless speed ratio, from zero or neutral to a fixed reduced gear ratio, and additional automatic means, controlled by the load on the driven shaft, for then further gradually and constantly decreasing the speed ratio from said fixed reduced gear ratio to a one-to-one or direct drive connection.

ROBERT L. PENNEY.